US011767026B2

(12) United States Patent
Sadhu et al.

(10) Patent No.: US 11,767,026 B2
(45) Date of Patent: Sep. 26, 2023

(54) METHOD AND SYSTEM FOR PATH PLANNING

(71) Applicant: Tata Consultancy Services Limited, Mumbai (IN)

(72) Inventors: Arup Kumar Sadhu, Kolkata (IN); Shubham Shukla, Kolkata (IN); Titas Bera, Kolkata (IN); Ranjan Dasgupta, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 805 days.

(21) Appl. No.: 16/874,116

(22) Filed: May 14, 2020

(65) Prior Publication Data

US 2020/0369292 A1 Nov. 26, 2020

(30) Foreign Application Priority Data

May 20, 2019 (IN) ............................ 201921019788

(51) Int. Cl.
*B60W 60/00* (2020.01)

(52) U.S. Cl.
CPC ....... *B60W 60/001* (2020.02); *B60W 2420/42* (2013.01)

(58) Field of Classification Search
CPC .. B60W 60/001; B60W 2420/42; G01C 21/20
See application file for complete search history.

(56) References Cited

U.S. PATENT DOCUMENTS 9,975,040 B2 * 5/2018 Wang .................... G09B 29/00
11,348,269 B1 * 5/2022 Ebrahimi Afrouzi ... G01S 17/89
(Continued)

FOREIGN PATENT DOCUMENTS

CN 104808671 7/2015

OTHER PUBLICATIONS

Blochliger et al., Topomap: Topological Mapping and Navigation Based on Visual SLAM Maps, 2018 IEEE International Conference on Robotics and Automation (ICRA),May 21-25, 2018, Brisbane, Australia (Year: 2018).*
(Continued)

*Primary Examiner* — Thomas Ingram
(74) *Attorney, Agent, or Firm* — Finnegan, Henderson, Farabow, Garrett & Dunner LLP

(57) ABSTRACT

The disclosure relates to motion planning for autonomous vehicles to find a contiguous path to travel from a source to a destination in a real time environment. But, motion planning suffers due to dimensionality problem during planning a path in high dimensional configuration space. Conventional a priori path planning techniques utilize deterministic selection of a seed and there is a challenge in providing resolution completeness, especially in a cluttered environment. Here, the resolution problem associated with the cluttered environment, is rectified by utilizing random seed generation technique. A convex region is grown around each seed and a set of hyperplanes are generated around each convex region. A contiguous polytope is created by utilizing the set of hyperplanes associated with each convex region. Further, an undirected graph is created based on a plurality of polytope points associated with the contiguous polytope and a shortest path in the graph is computed.

13 Claims, 14 Drawing Sheets

(56) References Cited

U.S. PATENT DOCUMENTS

| | | | | |
|---|---|---|---|---|
| 2016/0358378 | A1* | 12/2016 | Wang .................. | G06Q 10/047 |
| 2021/0094182 | A1* | 4/2021 | Sadhu .................. | G05D 1/0238 |

OTHER PUBLICATIONS

Kennedy III et al., Optimal Paths for Polygonal Robots in SE(2), ASMO Journal of Mechanisms and Robotics, Apr. 2018, vol. 10 (Year: 2018).*

Deits, R. et al. (Apr. 2015). "Computing Large Convex Regions of Obstacle-Free Space through Semidefinite Programming." *Algorithmic Foundations of Robotics*; pp. 109-124.

* cited by examiner

METHOD AND SYSTEM FOR PATH PLANNING

PRIORITY CLAIM

This U.S. patent application claims priority under 35 U.S.C. § 119 to: India Application No. 201921019788, filed on May 20, 2019. The entire contents of the aforementioned application are incorporated herein by reference.

TECHNICAL FIELD

The disclosure herein generally relates to path planning, and, more particularly, to a method and system for path planning for autonomous vehicles.

BACKGROUND

Motion planning, for autonomous vehicles is a process of finding a contiguous path to travel from a source to destination in a real time environment. But, motion planning suffers due to dimensionality problem during planning a path in high dimensional configuration space. Conventional methods follow a two stage path planning which includes a sampling based graph/tree data structure generation followed by a graph search technique.

However, the conventional approaches lack the selection of a proper sampling technique, which varies with the variation of the real time environment. Further, the conventional methods require to detect and avoid obstacles during the planning. Recent methods focuses on configuring obstacle free-space in a priori of the path planning based on seed techniques. However, the a priori path planning techniques utilize deterministic selection of a seed and there is a challenge in providing resolution completeness, especially in, a cluttered environment.

SUMMARY

Embodiments of the present disclosure present technological improvements as solutions to one or more of the above-mentioned technical problems recognized by the inventors in conventional systems. For example, in one embodiment, a method for path planning is provided. The method includes receiving, data pertaining to an environment from an imaging device, wherein the environment includes a plurality of obstacles; Further, the method includes, identifying a set of seeds based on the plurality of obstacles by utilizing a random seed generation technique. Further, the method includes constructing a contiguous polytope based on a convex region expanding technique by utilizing the set of seeds. Furthermore, the method includes identifying, a set of nodes of an undirected graph from the contiguous polytope, wherein the set of nodes are a plurality of polytope points associated with the contiguous polytope. Finally, the method includes, computing a shortest path in the undirected graph based on a distance between each pair of nodes of the undirected graph.

In another aspect, a system for path planning is provided. The system includes a computing device wherein the computing device includes, at least one memory comprising programmed instructions, at least one hardware processor operatively coupled to the at least one memory, wherein the at least one hardware processor is capable of executing the programmed instructions stored in the at least one memories and a path planning unit, wherein receive, data pertaining to an environment from an imaging device, wherein the environment includes a plurality of obstacles. Further, the path planning unit is configured to identify a set of seeds based on the plurality of obstacles by utilizing a random seed generation technique. Further, the path planning unit is configured to construct a contiguous polytope based on a convex region expanding technique by utilizing the set of seeds. Furthermore, the path planning unit is configured to identifying, a set of nodes of an undirected graph from the contiguous polytope, wherein the set of nodes are a plurality of polytope points associated with the contiguous polytope. Finally, the path planning unit is configured to compute a shortest path in the undirected graph based on a distance between each pair of nodes of the undirected graph.

In yet another aspect, a computer program product comprising a non-transitory computer-readable medium having the path planning unit is configured to embodied therein a computer program for method and system for path planning is provided. The computer readable program, when executed on a computing device, causes the computing device to receive data pertaining to an environment from an imaging device, wherein the environment includes a plurality of obstacles. Further, the computer readable program, when executed on a computing device, causes the computing device to identify a set of seeds based on the plurality of obstacles by utilizing a random seed generation technique. Further, the computer readable program, when executed on a computing device, causes the computing device to construct a contiguous polytope based on a convex region expanding technique by utilizing the set of seeds. Furthermore, the computer readable program, when executed on a computing device, causes the computing device to identify a set of nodes of an undirected graph from the contiguous polytope, wherein the set of nodes are a plurality of polytope points associated with the contiguous polytope. Finally, the computer readable program, when executed on a computing device, causes the computing device to compute a shortest path in the undirected graph based on a distance between each pair of nodes of the undirected graph.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
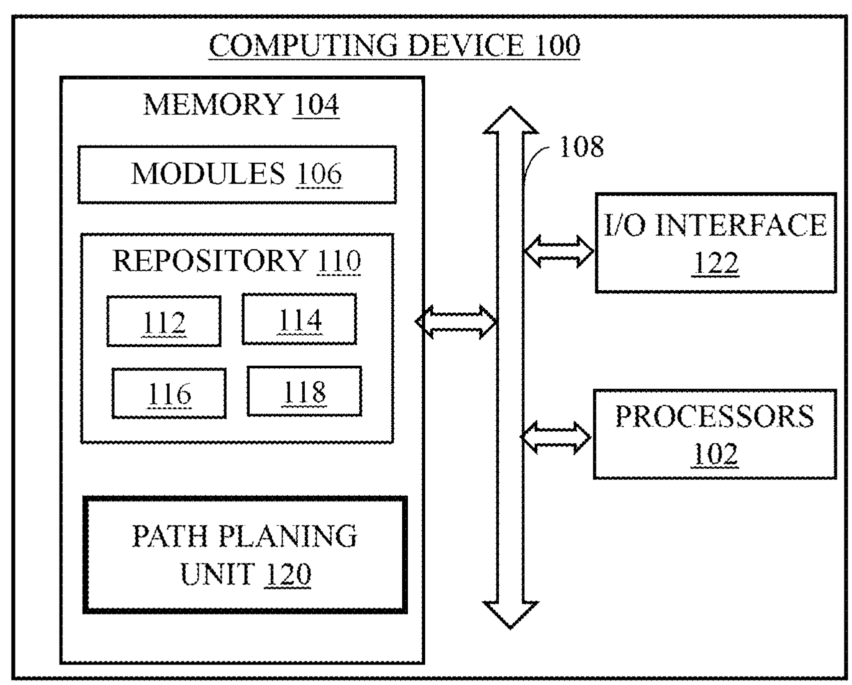
FIG. 1 is a functional block diagram of a system for path planning, according to some embodiments of the present disclosure.

Exemplary embodiments are described with reference to the, accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments herein provide a method and system for path planning. The system for path planning provides a safe path a priori in both cluttered environment and a clutter-free environment including a plurality of obstacles. Here, the resolution problem associated with the cluttered environment, is rectified by utilizing random seed generation technique. A set of random seeds are generated in the close vicinity of each obstacle from the plurality of obstacles based on a random walk. A convex region, for example, ellipsoid is generated around each seed. Further, a set of hyperplanes are generated around the convex region. The set of hyperplanes create a boundary between the convex region and the plurality of obstacles. A contiguous polytope is created by utilizing the set of hyperplanes associated with each convex region. Further, an undirected graph is created based on a plurality of polytope points associated with the contiguous polytope and a shortest path in the graph is computed. An implementation of the method and system for path planning is described further in detail with reference to FIGS. 1 through 7E.

Referring now to the drawings, and more particularly to FIG. 1 through 7E, where similar reference characters denote corresponding features consistently throughout the figures, there are shown preferred embodiments and these embodiments are described in the context of the following exemplary system and/or method.

FIG. 1 illustrates a functional block diagram of a system 100 for path planning according to some embodiments of the present disclosure, The system 100 includes or is otherwise in communication with one or more hardware processors, such as a processor 102 at least one memory such as a memory 104 an I/O interface 122. The memory 104 may include a path planning unit 120. In an embodiment, the path planning unit 120 including a random seed generation module (not shown in FIG. 2), spatial fringe frequency calculation module (not shown in FIG. 2), a contiguous polytope construction module (not shown in FIG. 2) and a graph construction and path computation module (not shown in FIG. 2). The processor 102, memory 104, and the I/O interface 122 may be coupled by a system bus such as a system bus 108 or a similar mechanism.

The I/O interface 122 may include a variety of software and hardware interfaces, for example, a web interface, a graphical user interface, and the like. The interfaces 122 may include a variety of software and hardware interfaces, for example, interfaces for peripheral device(s), such as a keyboard, a mouse, an external memory, an imaging device, a printer and the like. Further, the interfaces 122 may enable the computing device 100 to communicate with other devices, such as web servers and external databases. In an embodiment, the imaging device an be mounted on the autonomous vehicle and is configured to communicate with the system 100 through the I/O interface 122. The autonomous vehicle includes a robot, UAV (Unmanned Aerial Vehicle) and the like.

The interfaces 122 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 122 may include one or more ports for connecting a number of computing systems with one another, or to another server computer. The I/O interface 122 may include one or more ports for connecting a number of devices to one another or to another server.

The hardware processor 102 may be implemented as one or more microprocessors, microcomputers, microcontrollers, digital signal processors, central processing units, state machines, logic circuitries, and/or any devices that manipulate signals based on operational instructions. Among other capabilities, the hardware processor 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and or non-volatile memory, such as read only memory (ROM), erasable programmable ROM, flash memories, hard disks, optical disks, and magnetic tapes. In an embodiment, the memory 104 includes a plurality of modules 106 and a repository 110 for storing data processed, received, and generated by one or more of the modules 106 and the image analysis unit 120. The modules 106 may include routines, programs, objects, components, data structures, and so on, which perform particular tasks or implement particular abstract data types.

The memory 104 also includes module(s) 106 and a data repository 110. The module(s) 106 include programs or coded instructions that supplement applications or functions performed by the system 100 for path planning. The modules 106, amongst other things, can include routines, programs, objects, components, and data structures, which perform particular tasks or implement particular abstract data types. The modules 106 may also be used as, signal processor(s), state machine(s), logic circuitries, and/or any other device or component that manipulates signals based on operational instructions. Further, the modules 106 can be used by hardware, by computer-readable instructions executed by a processing unit, or by a combination thereof. The modules 106 can include various sub-modules (not shown). The modules 106 may include computer-readable instructions that supplement applications or functions performed by the system 100 for path planning.

The data repository 110 may include received images 112, data pertaining to random seed generation technique 114, data pertaining to convex region expanding technique 116 and other data 118 Further, the other data 118 amongst other things, may serve as a repository for storing data that is processed, received, or generated as a result of the execution of one or more modules in the module(s) 106 and the modules associated with the path planning unit 120.

Although the data repository 110 is shown internal to the computing device 100, it will be noted that, in alternate embodiments, the data repository 110 can also be implemented external to the computing device 100, where the data repository 110 may be stored within a database (not shown in FIG. 1) communicatively coupled to the computing device 100. The data contained within such external database may be periodically updated. For example, new data may be added into the database (not shown in FIG. 1) and/or existing data may be modified and/or non-useful data may be deleted from the database (not shown in FIG. 1). In one example, the data may be stored in an external system, such as a Lightweight Directory Access Protocol (LDAP) directory and a Relational Database Management System (RDBMS). In another embodiment, the data stored in the data repository 110 may be distributed between the computing device 104 and the external database (not shown).

In an embodiment, the method for path planning includes the following major steps: (1) Randomized and guided iterative inflation (2) Contiguous free space generation and (3) Undirected graph formation and computation of shortest path. The major steps are explained further in the following paragraphs.

In an embodiment, the contiguous free space generation is performed either by at least one of an Iterative Regional Inflation by Semidefinite programming (IRIS) and an Extended IRIS (EIRIS) from a set of initial candidate seed points through a series of convex region optimization. Keeping contiguousness of such convex partitioning cannot be guaranteed a priori. However, contiguousness is necessary for successful path planning. Further, a random walk based approach is utilized to further alleviate the problem of resolution completeness, by keeping the partitioning computationally tractable. For example the system 100 can be installed on an autonomous vehicle to determine independently, the path between a source location and a destination location identified by the vehicle.

The path planning unit 120 of the system 100 can be configured to receive data pertaining to an environment from the imaging device, wherein the environment including the plurality of obstacles. In an embodiment, the environment is a cluttered environment and in another embodiment, the environment is a clutter-free environment.

In an embodiment, consider the cluttered environment, $E \in R^n$, $n \in [1, N_d]$. The dimension of the environment is $N_d$, with a finite set of convex polygonal obstacles, $O_i$, $i=\{1,2, \ldots, m\}$, each of which is represented as, $O_i = H_1 \cap H_2 \cap H_3 \ldots \cap H_n$, where $H_1, H_2, H_3 \ldots H_n$ are half planes required to form $O_i$. The criticality of the environment can be associated with the $\propto-\beta$ expansiveness property of E. The $\propto-\beta$ expansiveness property describes a degree of clutteredness of the environment, wherein both alpha and gamma lie between 0 and 1.

For example, path planning of a robot in E, having non-trivial geometrical shape and with d degrees of freedom, is equivalent to a motion planning in configuration space $C \in R^d$. Further, C can be partitioned into $C_{free}$ and $C_{obs}$, where a configuration $q \in C_{free}$ implies that the robot placed at q is not colliding with any of the $O_i$. The corresponding configuration space obstacle can be obtained using Minkowski sum, and is represented as, $C_{obs} \triangleq O \oplus R$, where R is the rigid robot geometry. Given an initial and goal configuration $\{q_s, q_g\} \in C_{free}$, the path planning problem is to find a continuous function $f:[0,1] \rightarrow C_{free}$ connecting $q_s$ and $q_g$, without colliding with any of the $O_i$. In a specific se of Safe and Fast Path planning (SEP), we consider $q \triangleq \{P, \theta\}$ where P and θ are respectively be the Cartesian position and orientation of rigid robot geometry. For brevity of description the present disclosure and SFP is used interchangeably.

Further, C be locally Euclidean and inherits Euclidean metric. $C_{free}$ can be partitioned into a finite set of convex polytopes $P_i$, $i \in \{1,2,3 \ldots P_{max}\}$. A point $q \in P_i$ is called an interior point in $P_i$ if a small ball centered at q lying entirely in $P_i$. The relative interior of a polytope $P_i$ (denoted as $R_{qi}$) is defined as an interior within the affine hull of $P_i$. In other words, $R_q \triangleq \{q \in P_i: \exists \in >0, N_\in(q) \cap aff(P_i) \subseteq P_i\} P, \theta\}$, where aff $(P_i)$ is affine hull of $(P_i)$ and $N_\in(q)$ is a ball of radius ∈.

Further, the path planning unit 120 of the system 100 can be configured to identify the set of seeds based on the plurality of obstacles by utilizing the random seed generation technique. The random seed generation technique includes the following steps: (1) generating a random point inside each obstacle from the plurality of obstacles (2) performing a random walk by each random point towards a surface of each obstacle (3) identifying the random point as seed point when the random point walks outside the obstacle, to obtain a plurality of seed points and (4) selecting a set of seed points from the plurality of seed points based on an a predefined threshold.

Figure 2:
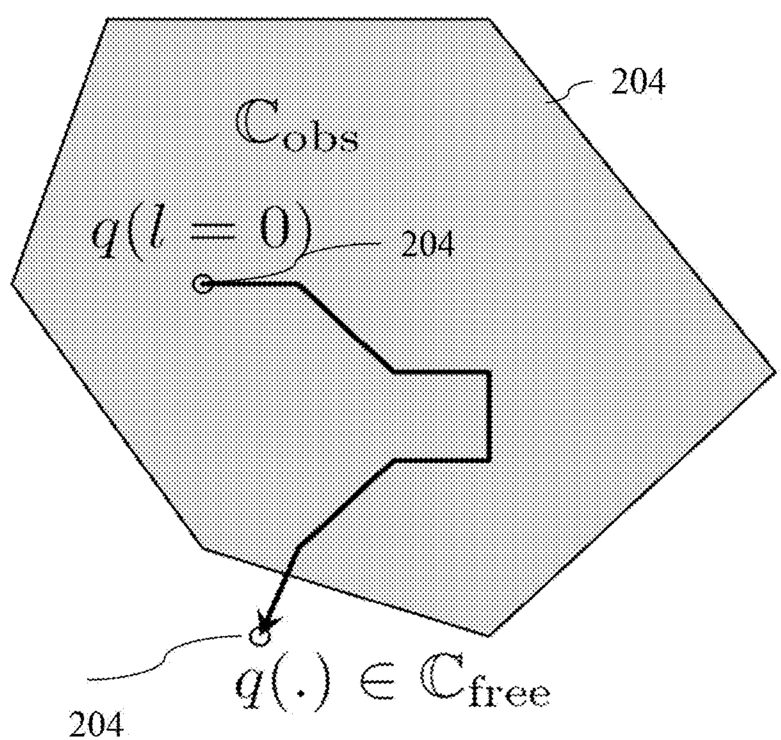
FIG. 2 illustrates a fixed length random walk performed by the system for path planning, in accordance with some embodiments of the present disclosure.

FIG. 2 illustrates a fixed length random walk performed by the system for path planning, in accordance with some embodiments of the present disclosure. Now referring to FIG. 2, 206 is an obstacle and 202 is a random point inside the obstacle. 204 is a seed point obtained by random walk from the random point 202 towards the surface of the obstacle 206.

In an embodiment, referring to FIG. 2, a point q(l=0) is generated within a configuration space obstacle $C_{obs}$ and the point continues a fixed length continuum random-walk until $q(.) \in C_{free}$. Let, $N_r$ be the set of random points. A plurality of points from the set of points, reaching the surface of the obstacle are taken as the plurality of candidate seeds/seeds around each $C_{obs}$. Further an elimination process is utilized to select the set of seed points from the plurality of candidate seeds. The set of seed points, be $S_r$ are selected based on a predefined threshold, th and eliminator rule, rule.

Further, the path planning unit 120 of the system 100 can be configured to construct the contiguous polytope based on a convex region expanding technique by utilizing the set of seeds. The method of construction the contiguous polytope includes the following steps: (1) constructing a convex region around each seed form the set of seeds to obtain a plurality of convex regions (2) simultaneously constructing a set of hyperplanes around each convex region from the plurality of convex regions (3) iteratively expanding, each convex region till the edge of each convex region touches at least one hyperplane associated with rest of the convex regions, wherein each hyperplane simultaneously adapts to the expanding convex region. The set of hyperplanes create a boundary between the plurality of convex regions and the plurality of obstacles and (4) constructing, a contiguous polytope by utilizing the set of hyperplanes corresponding to each convex region, wherein the contiguous polytope includes a plurality of polytopes corresponding to each set of hyperplanes.

Figure 3:
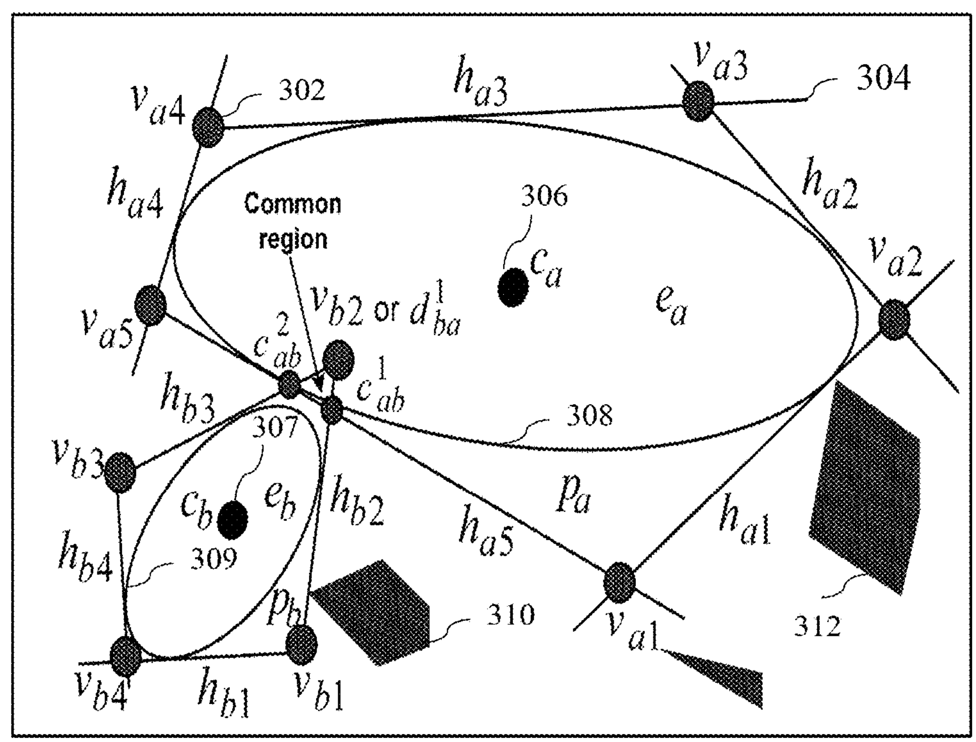
FIG. 3 illustrates an intersection of hyperplanes obtained during convex region expanding technique, in accordance with some embodiments of the present disclosure.

FIG. 3 illustrates an intersection of hyperplanes obtained during convex region expanding technique, in accordance with some embodiments of the present disclosure. In an embodiment, let, a $C_{free}$ partitioning generates ellipsoids $e_i$, $i \in [1,N]$, where N be the total number of convex regions. An $i^{th}$ ellipsoid is isolated from obstacles set O, and boundaries of the environment are isolated by a set of separating hyperplanes $h_j$, where $j \in [1, H_i]$, and $H_i$ be the total number of hyperplanes $h_{ij}$, inscribing $i^{th}$ ellipsoid. Now referring to FIG. 2, 310 and 312 are obstacles of the cluttered environment, 308 and 309 are ellipses or convex regions, 306 and 307 are the center of the corresponding convex regions 308 and 309. Further, 304 is a hyperplane and 302 is a point of intersection of two hyperplanes which forms a node of an undirected graph. For example, $H_a=5$ and $H_b=4$, where $a,b \in [1,N]$. The $i^{th}$ set of separating hyperplanes forms the contiguous polytope $p_i$. Further, a contiguous partitioning of free-space can be obtained by detecting the intersection points of the polytopes by solving a set of linear equations. These intersection points are defined as $v_{ij}, j \in [1,H_i]$. In FIG. 2 intersection points for the contiguous polytope $p_a$ are $v_{a1}-v_{a5}$.

In an embodiment, let $c_i$ be the centroid of the ellipsoid $e_i$. Let $d_{ji}^{m'}, n' \in [1,D_i]$ refers to the pj's vertex within $p_i$, where $D_i$ be the maximum number of such interior points. $c_{ij}^{m'}$, $m' \in [1,C_i]$ indicates the intersection point between $p_i$ and $p_j$, where $C_i$ is the maximum number of such intersection point of $p_i$ with other polytopes. Let, $I_i$ be a subset of interior points of $p_i$ defined as, $I_i \triangleq \{c_i \cup_{i=1,i \neq j}^{N} \{d_{ji}^{1}, d_{ji}^{2} \ldots d_{ji}^{D_i}\} \cup_{i=1,i \neq j}^{N} c_j | c_j \in p_i$. Define $P_i$ as union of $I_i$ and a subset of relative interior points of $p_i$, that is, $P_i \triangleq I_i \cup RI_i$, where $RI_i \triangleq \{v_{i1}, v_{i2} \ldots v_{iH}\} \cup_{i=1,i \neq j}^{N} \{C_{ij}^{1}, c_{ij}^{2} \ldots c_{ij}^{C_i}\}$.

In an embodiment, the points shared by two adjacent polytopes $p_i$ and $p_j$ are defined as, $\overline{P}_{ij} \triangleq P_i \cap P_j$. Here, an inference can be drawn that any point belongs $\overline{P}_{ij}$ can be connected to, any point within $p_i$ or $p_j$. Because of the convexity property, the line segment formed can be guaranteed to lie within $p_i$ and $p_j$. Therefore, the interior points can be considered as candidate waypoints, belonging to the safe and free partitions of configuration space. However, the iterative generation method of polytopes $p_i$ depends on the resolution completeness of the problem. if the configuration space possess a narrow critical segment with poor $\propto-\beta$ expansiveness, a contiguous polytopic partitioning is unlikely. One way to circumvent such problem is to, increase the number of seed points and generate more denser polytopic regions, which, however, increases to obvious computational burden. An alternative could be to use an elimination process followed by a randomized approach.

Further, the path planning unit 120 of the system 100 can be configured to identify, the set of nodes of the undirected graph from the contiguous polytope, wherein the set of nodes are a plurality of polytope points associated with the contiguous polytope. The plurality of polytope points includes hyperplane intersection points, inter polytope intersection point and a center of each polytope.

In an embodiment, the present disclosure for Safe and Fast Path planning (SFP) algorithm is described below. Here, configuration space associated with the obstacle is calculated using Minkowski sum before convex free-space generation by utilizing IRIS and ERIS method. The algorithm 1 generates the contiguous polytope information, i.e., $C_{free}$. This $C_{free}$ can be utilized to create a set of candidate waypoints and are employed to create an undirected graph data structure. Naturally, the undirected graph data structure completely belongs to $C_{free}$. Hence, the undirected graph formation does not require to detect and avoid obstacles any more. The nodes in the undirected graph includes of all the interior and relative interior points of polytope partition. Each edge in the graph is associated with the cost of travelling from one node to another. In other words, a function on the Euclidean distance metric. An infinity cost indicates no connection. The graph adjacency matrix A has a dimension of M×M, where $M=\Sigma_{i=1}^{n} |\{P_i\}|$. The adjacency matrix A is created by following Rule 1 and Rule 2.

Rule 1: Connect (except self-loop) all the points (or nodes) belong to $\overline{P}_{ij}$, $\forall(i,j)$, for all the points in $P_i$ and $P_j$. Compute cost between the connected nodes by evaluating the Euclidean distance between the very nodes (or points).

Rule 2: Mutually connect (except self-loop) all the points (or nodes) belong to $P_i$, $\forall i, i \in [1,N]$. Compute cost between the connected nodes by evaluating the Euclidean distance between the very nodes (or points).

Algorithm 1: Contiguous free-space generation (CFG)

```
Input:S < −No.of seeds,O,rigid body geometry,R
Output: {P_i} and {P̄_ij,}
Initialize:
{P_i} < −Ø and {P̄_ij,} < − Ø ;
C_obs < −Minkowski(O,R);
N_r < −random walk towards (C_obs);
S_r < −Neighbour Elimination (N_r,,th,rule);
for i = 1 ... ...|S| do
[e_i,{h_in}] < − EIRIS (s_i,C_obs), n ∈ [1,H_i];
compute vertex v_in,∀n,n ∈ [1,K_i] for p_i;
compute I_i and RI_i;
compute P̄_i;
    P_i < − {P_i} ∪ P_i;
            for j = 1 ... ... |S| do
                    compute I_j and RI_j, P_j;
                    Compute P̄_ij ;
                    {P̄_ij}←{P̄_ij} ∪ P̄_ij ;
                end
S < −S ∪ S_r;
for k = 1 ... ... |S| do
S_k < −k^th seed;
i < − i + 1;
[e_i,{h_in}] < − IRIS (s_i,C_obs), n ∈ [1,H_i];
compute vertex v_in ∀n,n ∈ [1,K_i] for p_i;
compute I_i and RI_i;
compute P_i;
P_i < − {P_i} ∪ P_i;
    for j = 1 ... ... |S| do
        compute I_j and RI_j, P_j;
        compute P̄_ij;
        {P̄_ij}←{P̄_ij} ∪ P̄_ij;
end
S < −S ∪ S_r;
end
End
End
```

Further, the path planning unit 120 of the system 100 can be configured to compute the shortest path in the undirected graph based on a distance between each pair of nodes of the undirected graph.

Figure 4:
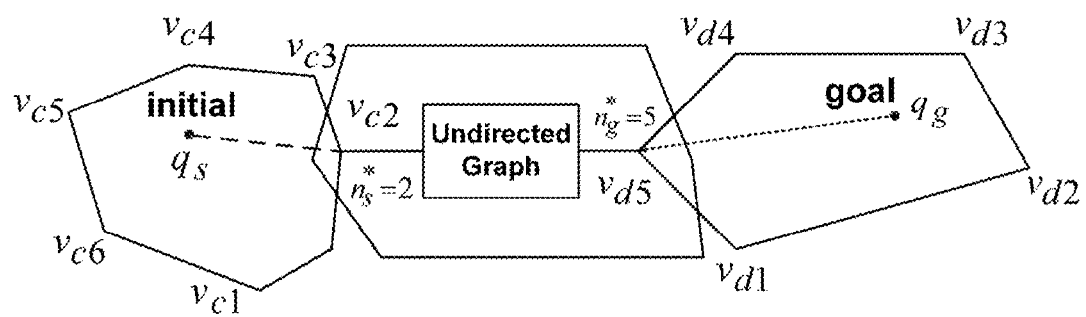
FIG. 4 illustrates a connection between initial and goal configuration in an undirected graph, in accordance with some embodiments of the present disclosure.

FIG. 4 illustrates a connection between initial and goal configuration with an undirected graph, in accordance with some embodiments of the present disclosure, Now referring to FIG. 4, starting point is $q_s$ and the goal is $q_g$. The undirected graph, is guaranteed to lie inside the obstacle free space, i.e., $C_{free}$ and hence the SFP does not require to avoid any obstacle in the course of path planning. However, it is not guaranteed that the initial and goal configuration of the robot, that is $q_s$ and $q_g$, will be a node in $\{P_i\}$. Hence, two additional nodes are introduced in the graph corresponding to $q_s$ and $q_g$ as shown in FIG. 4. The newly introduced nodes are now connected to the points inscribed by the corresponding polytopes as shown in FIG. 4. Finally, to update adjacency matrix, A the newly introduced nodes connections' costing are computed. Subsequently, the planning algorithm (Algorithm 2) is executed with updated A to obtain an optimal path. Now, as SFP is a multiple query search [4] algorithm, each execution of SFP introduces two nodes (one node in case of fixed $q_s$ or $q_g$) and corresponding edges to the graph. If the newly introduced nodes are removed during re-planning, potential information to find the optimal path may be lost.

Algorithm 2: Safe and Fast Path Planning (SFP)

Input: Initial configuration ($q_s$), Goal configuration ($q_g$)) and Adjacency matrix (A);
Output: Path (or sequence of nodes from $q_s$ to $q_g$);
Function: Path= SFP(A, $q_s$, $q_g$)
Begin
1: evaluate $n^*_s$ and $n^*_g$ respectively by using rule 1 and rule 2;
2: connect $q_s$ with $PPin^*_s$,i ∈ [1,N];
3: connect $q_g$ with $PPin^*_g$,j ∈ [1,N];
4: update A by evaluating the Euclidean distances between $PPin^*_s$,$q_s$and $PPin^*_g q_g$;
5: call path=Dijkstra(A, $q_s$,$q_g$);
End In an embodiment, if the newly introduced nodes are preserved, then the graph becomes unnecessarily populated. This adversely effects the performance of Algorithm 2. The above conflict is avoided by connecting $q_s$ with $n^*_s$, evaluated by (1), as shown in FIG. 4. Similarly, $q_g$ is connected with $n^*_g$ evaluated by (2). Based on the path offered by Algorithm 2 a curve is fitted between $q_s$ and $q_g$ for trajectory execution.

$$n_s^* = \arg\min_{n\in[1,|P_i|]}[\|q_s - P_{in}\| + \|P_{in} - q_g\|] \Big| P_{in} \in P_i \quad (1)$$

$$n_g^* = \arg\min_{n\in[1,|P_j|]}[\|q_g - P_{jn}\| + \|P_{jn} - q_s\|] \Big| P_{jn} \in P_j \quad (2)$$

Figure 5A:
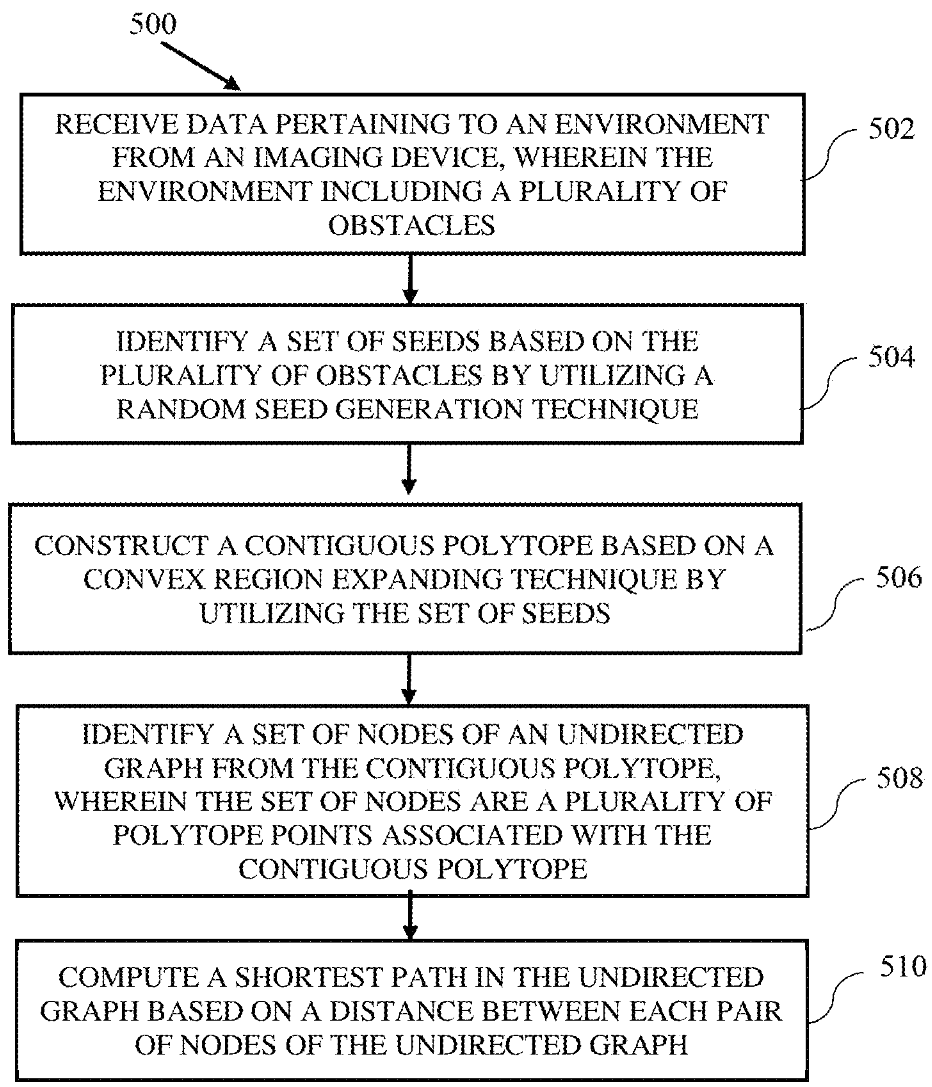
FIG. 5A is an exemplary flow diagram for a processor implemented method for path planning, according to some embodiments of the present disclosure.

FIG. 5A is an exemplary flow diagram for a processor implemented method for path planning, according to some embodiments of the present disclosure. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communication network. The order in which the method 500 is described is not intended to be construed as a limitation, and any number of the described method blocks can be combined in any order to implement the method 500, or an alternative method. Furthermore, the method 500 can be implemented in any suitable hardware, software, firmware, or combination thereof.

At 502, the system 100, receives, by a one or more hardware processors, data pertaining to an environment from an imaging device, wherein the environment including a plurality of obstacles. The environment be at least one of a cluttered environment or a clutter-free environment. At 504, the system 100 identifies, by the one or more hardware processors, the set of seeds based on the plurality of obstacles by utilizing a random seed generation technique. The random seed generation method includes: (1) generating the random point inside each obstacle from the plurality of obstacles (2) performing a random walk by each random point towards the surface of each obstacle (3) identifying the random point as a seed point when the random point walks outside the obstacle, to obtain a plurality of seed points and (4) selecting the set of seed points from the plurality of seed points based on an a predefined threshold At 506, the system 100 constructs, by the one or more hardware processors the contiguous polytope based on a convex region expanding technique by utilizing the set of seeds. The convex region expanding technique includes: (1) constructing the convex region around each seed form the set of seeds to obtain the plurality of convex regions (2) simultaneously constructing the set of hyperplanes around each convex region from the plurality of convex regions (3) iteratively expanding, each convex region till the edge of each convex region touches at least one hyperplane associated with rest of the convex regions and (4) constructing, the contiguous polytope by utilizing the set of hyperplanes corresponding to each convex region, wherein the contiguous polytope includes a plurality of polytopes corresponding to each set of hyperplanes. Here, each hyperplane simultaneously adapts to the expanding convex region and each hyperplane from the set of hyperplanes create the boundary between the plurality of convex region and the plurality of obstacles. At 508, the system 100 identifies by the one or more hardware processors, the set of nodes of an undirected graph from the contiguous polytope, wherein the set of nodes are the plurality of polytope points associated with the contiguous polytope. The plurality of polytope points includes hyperplane intersection points, inter polytope intersection point and a center of each polytope. At 510, the system 100 computes, by the one or more hardware processors, the shortest path in the undirected graph based on the distance between each pair of nodes of the undirected graph.

Figure 5B:
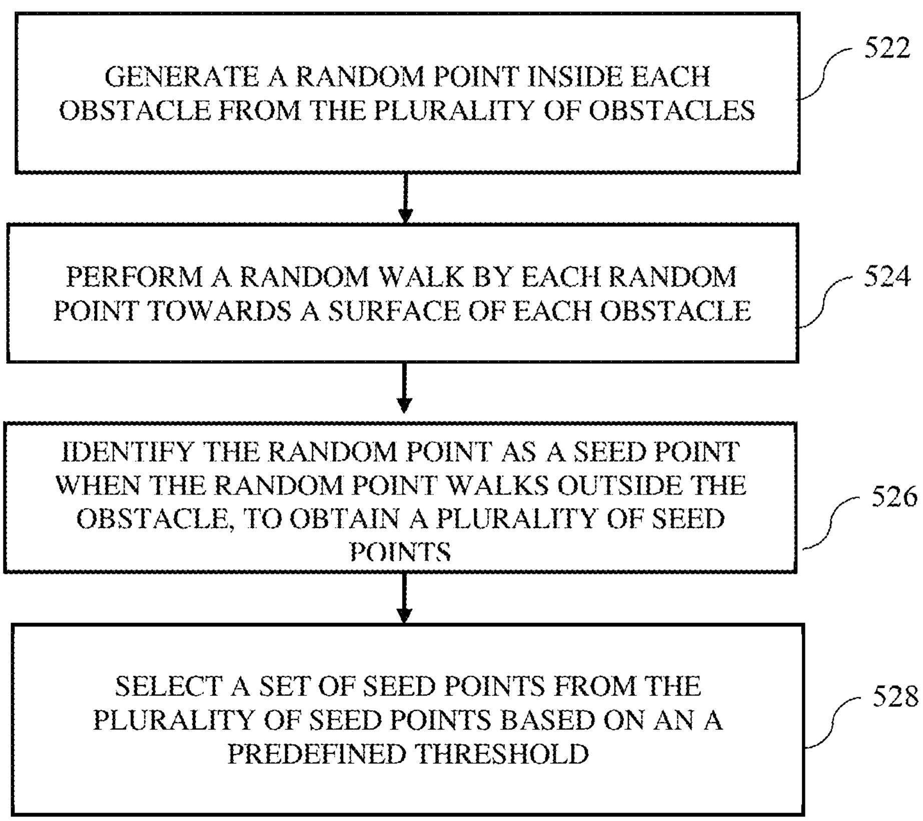
FIG. 5B is an exemplary flow diagram for a processor implemented method for random seed generation, according to some FIG. 6A through FIG. 7E illustrates experimental results of the method and system for path planning, according to some embodiments of the present disclosure.

FIG. 5B is an exemplary flow diagram for a processor implemented method for random seed generation, according to some embodiments of the present disclosure. At step 522, the system 100 generates, by the one or more hardware processors, the random point inside each obstacle from the plurality of obstacles. At step 524, the system 100 performs, by the one or more hardware processors, a random walk by each random point towards a surface of each obstacle. At step 526, the system 100 identifies, by the one or more hardware processors, the random point as a seed point when the random point walks outside the obstacle, to obtain the plurality of seed points. At step 528, the system 100 selects, by the one or more hardware processors, the set of seed points from the plurality of seed points based on an a predefined threshold.

Experimentation: in an embodiment, the present disclosure is experimented as follows and the simulation results were obtained. FIG. 6A through FIG. 7E illustrates an experimental results of the method and system for path planning, according to some embodiments of the present disclosure.

FIG. 6A through FIG. 6F illustrates mean (M) and standard deviation (SD) computation of the performance metrics in different obstacle maps, according to some embodiments of the present disclosure. Here, performance metrics include run-tithe, path length and performance index (PI) of the present disclosure and contender algorithms (PRM (Probability Roadmap Method), RRT (Rapidly exploring Random Tree) and bRRT (bidirectional RRT). Now referring to FIG. 6A, the mean of runtime associated with the present disclosure, bRRT, RRT and PRM are plotted. The line plot 602 indicates the mean of runtime associated with the present disclosure, the line plot 604 indicates the mean of runtime associated with bRRT, the line plot 606 indicates the mean of runtime associated with RRT and the line plot 608 indicates the mean of runtime associated with PRM.

Figure 6A:
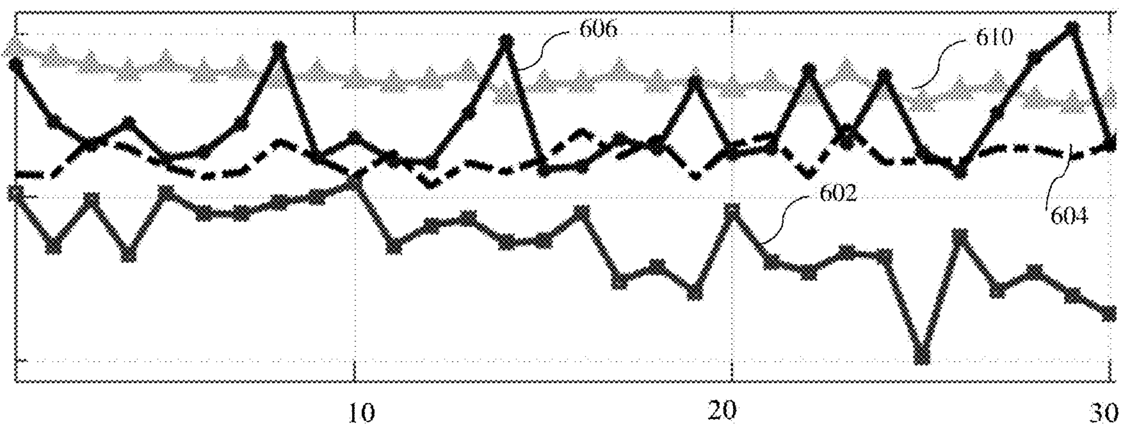
Figure 6B:
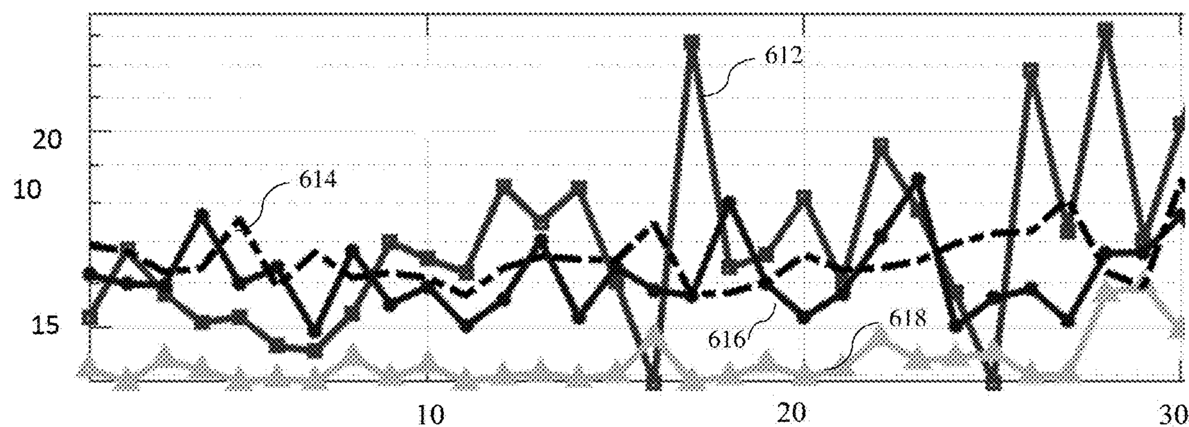

Now referring to FIG. 6B, the mean of path length associated with the present disclosure, bRRT, RRT and PRM are plotted. The line plot 612 indicates the mean of path length associated with the present disclosure, the line plot 614 indicates the mean of path length associated with bRRT, the line plot 616 indicates the mean of path length associated with RRT and the line plot 618 indicates the mean of path length associated with PRM.

Figure 6C:
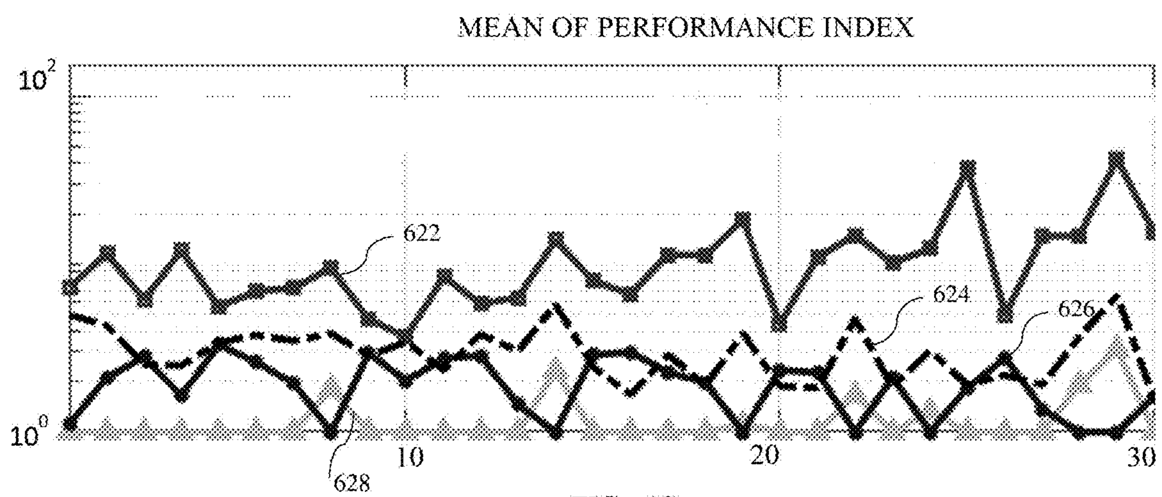

Now referring to FIG. 6C, the mean of performance index associated with the present disclosure, bRRT, RRT and PRM are plotted. The line plot 622 indicates the mean of performance index associated with the present disclosure, the line plot 624 indicates the mean of performance index associated with bRRT, the line plot 626 indicates the mean of performance index associated with RAT and the line plot 628 indicates the mean of performance index associated with PRM.

Figure 6D:
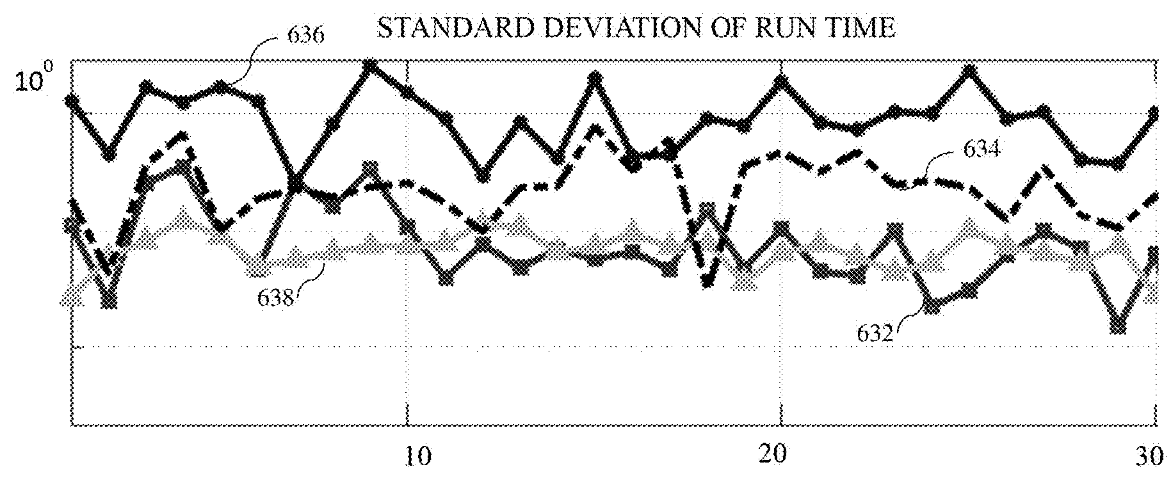

Now referring to FIG. 6D, the Standard Deviation (SD) of runtime associated with the present disclosure, bRRT, RRT and PRM are plotted. The line plot 632 indicates the SD of runtime associated with the present disclosure, the line plot 634 indicates the SD of runtime associated with bRRT, the line plot 636 indicates the SD of runtime associated with RRT and the line plot 638 indicates the SD of runtime associated with PRM.

Figure 6E:
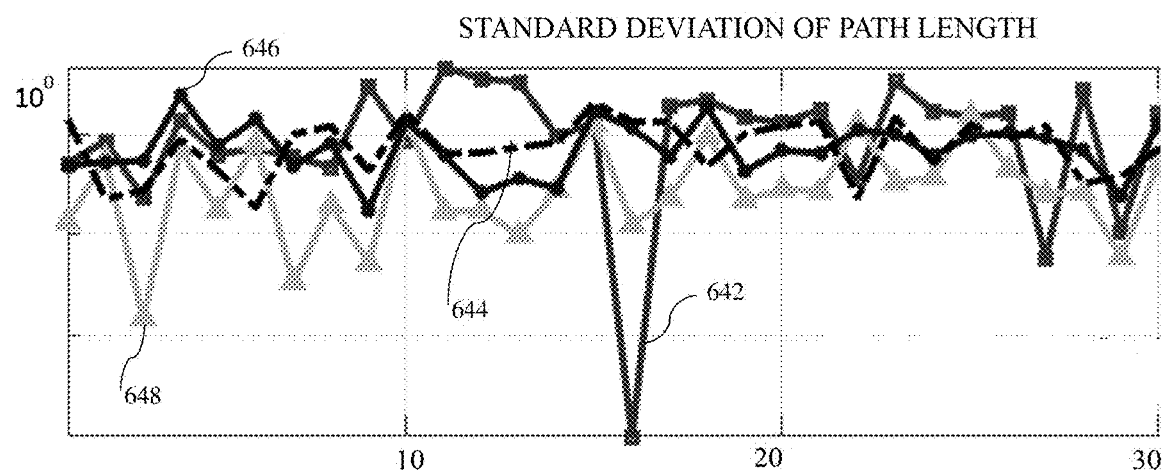

Now referring to FIG. 6E, the SD of path length associated with the present disclosure, bRRT, RRT and PRM are plotted. The line plot 642 indicates the SD of path length associated with the present disclosure, the line plot 644 indicates the SD of path length associated with bRRT, the line plot 646 indicates the SD of path length associated with RRT and the line plot 648 indicates the SD of path length associated with PRM.

Figure 6F:
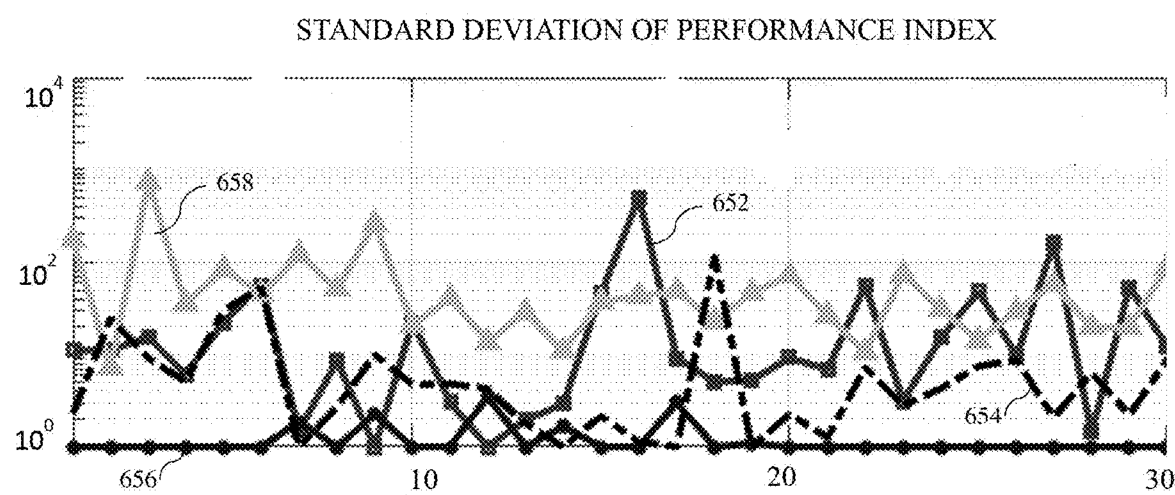

Now referring to FIG. 6F, the SD of performance index associated with the present disclosure, bRRT, RRT and PAM are plotted. The line plot 652 indicates the SD of performance index associated with the present disclosure, the line plot 654 indicates the SD of performance index associated with bRRT, the line plot 656 indicates the SD of performance index associated with RRT and the line plot 658 indicates the SD of performance index associated with PRM.

Figure 7A:
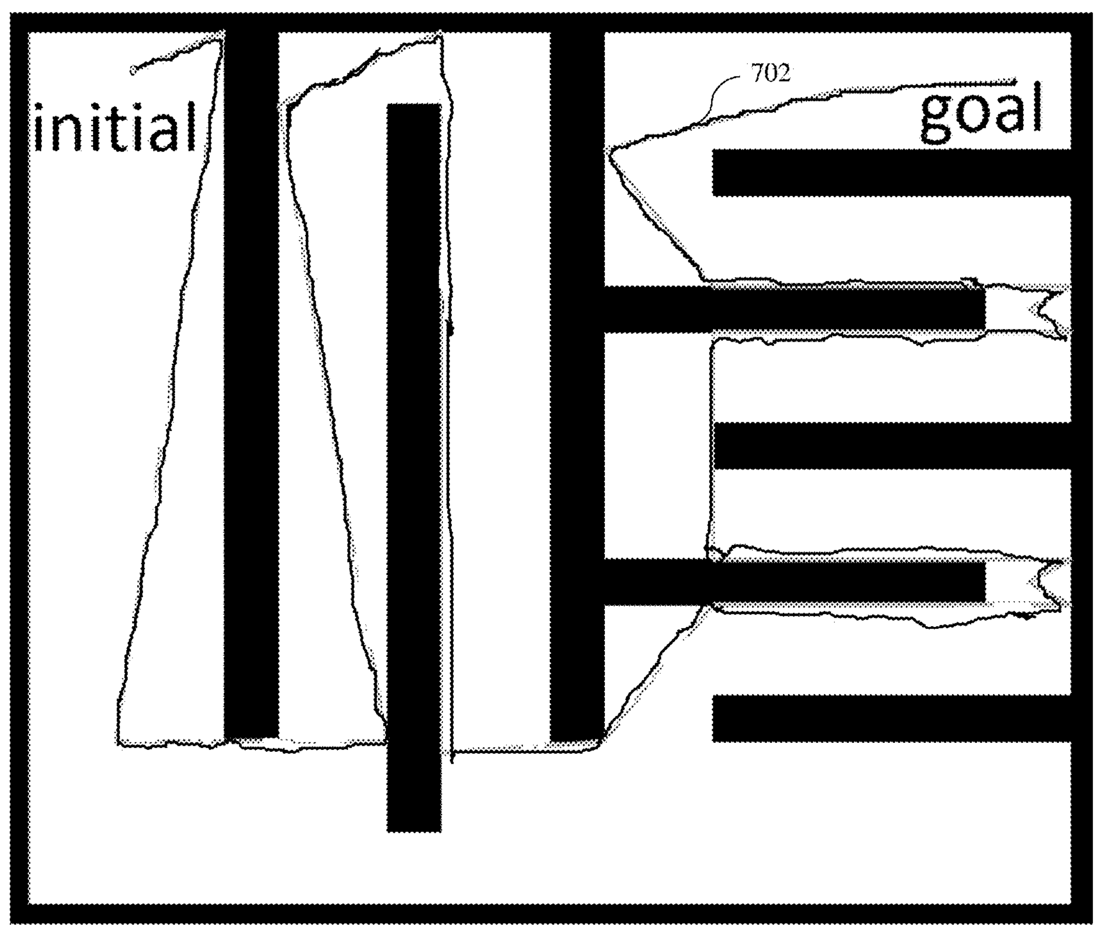
Figure 7B:
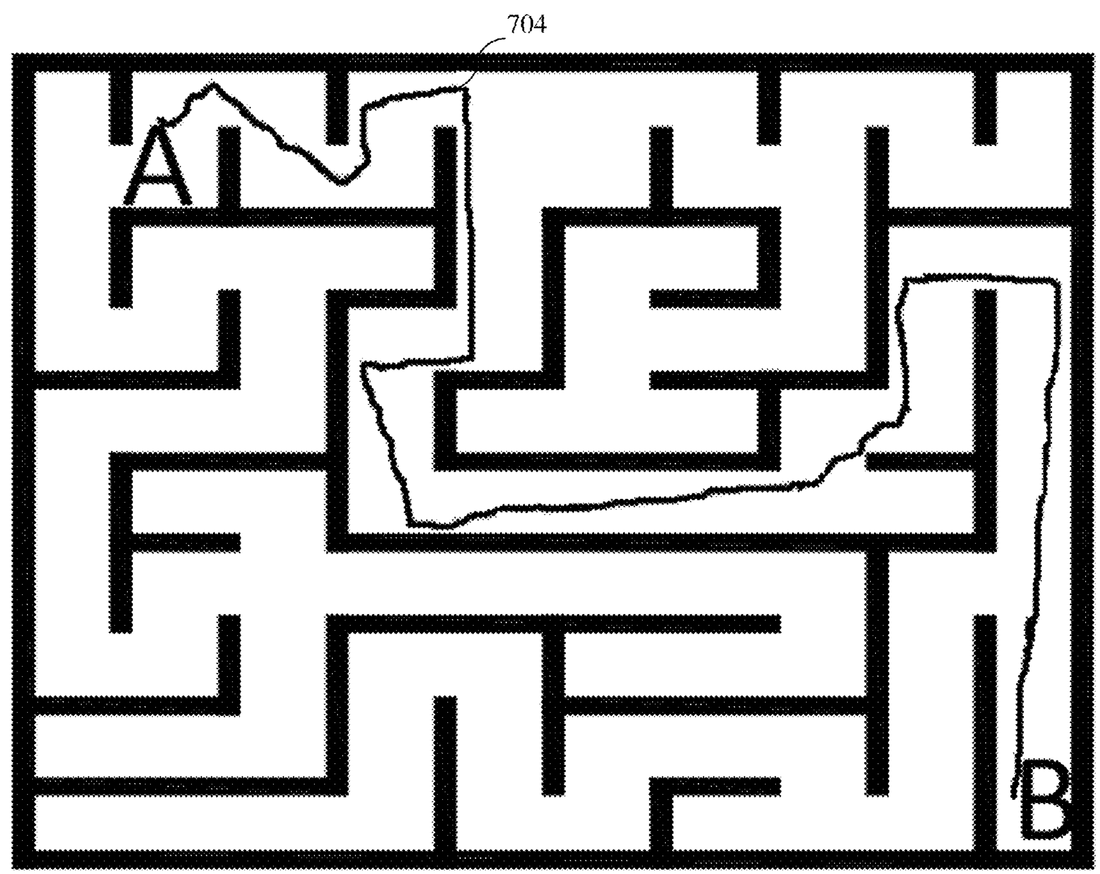

FIG. 7A and 7B illustrates an exemplary path planning in maze, according to some embodiments of the present disclosure. Now referring to FIG. 7A, the source point is 'initial' and the destination point is 'goal'. The path is represented as 702. Now referring to FIG. 7B, the source point is 'A' and the destination point is 'B'. The path is represented as 704.

Figure 7C:
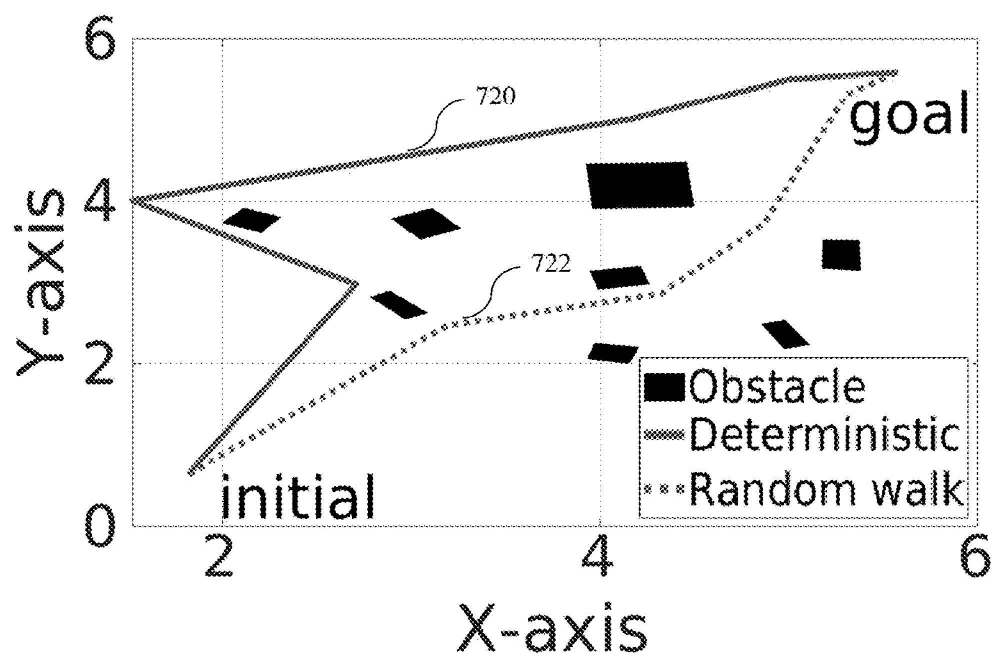
Figure 7D:
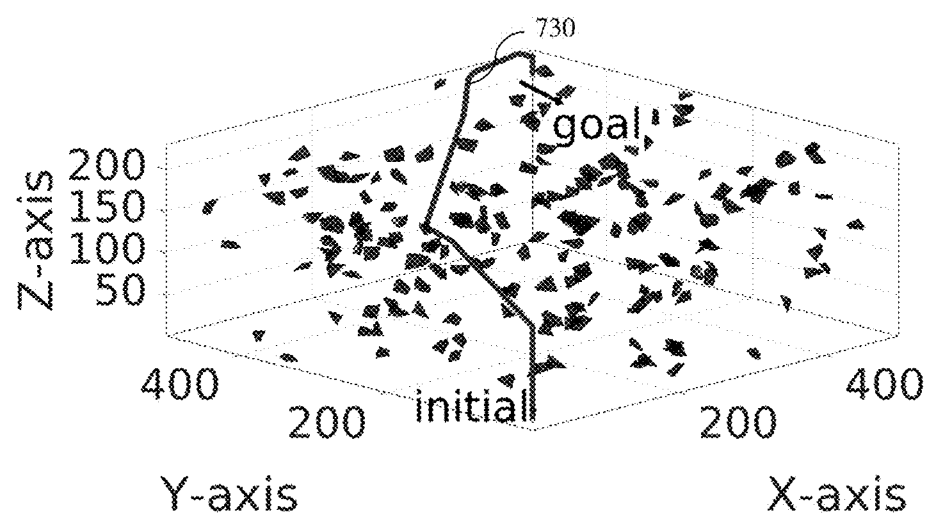

FIG. 7C to 7D illustrates an exemplary path planning of the present disclosure in 2 Dimensional and 3 Dimensional space respectively, according to some embodiments of the present disclosure. Referring to FIG. 7C, the path planned by the SFP (random walk based seed generation) is depicted in dotted line 722 and the path planned by the deterministic seed based method is depicted in solid line 720. To make the results empirically more significant success rate of the PRM over SFP/present disclosure for a typical maze is shown in the third fold. Now referring to FIG. 7D, the path planned by the SFP is depicted as solid line 730.

Figure 7E:
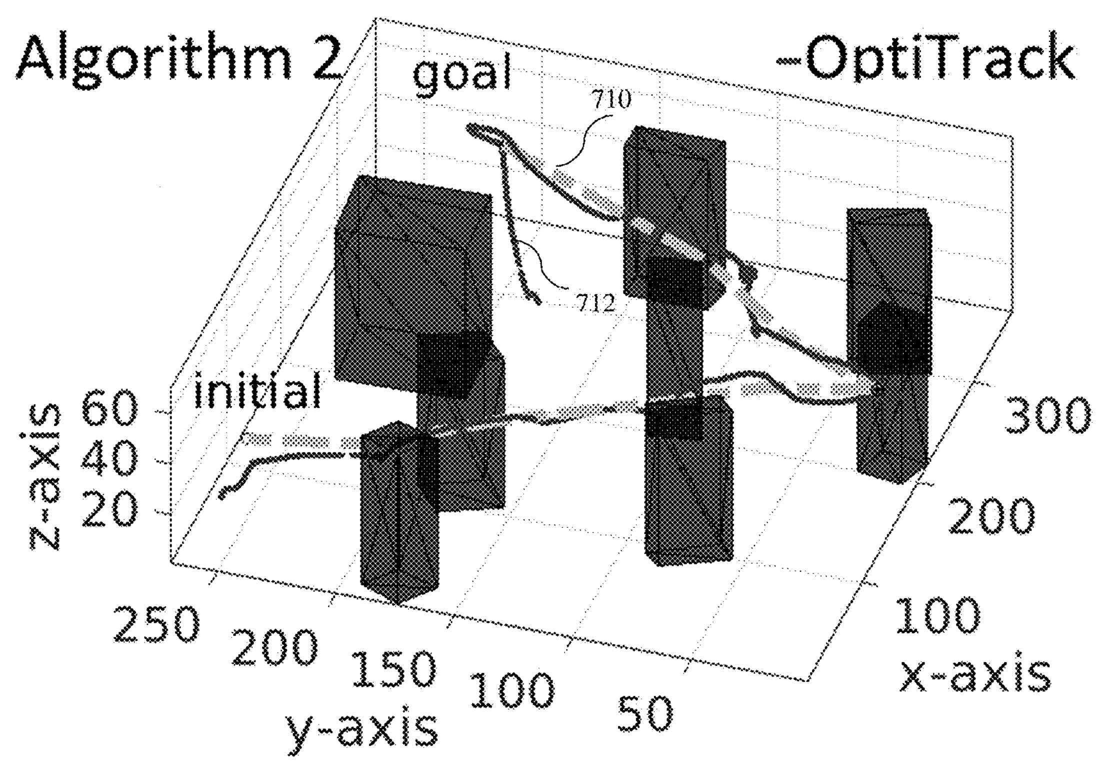

FIG. 7E illustrates an exemplary simulation results in real-time by employing a CrazyFlie for path planning in 3D, according to some embodiments of the present disclosure. Here, the path planned by the OptiTrack method is shown in dotted line 740 and the path planned by the SFP (Algorithm 2) is represented as solid line 742. It is apparent that superiority of the proposed methodology (Algorithm 1 and 2) can be confirmed only if SFP outperforms the reference algorithms in terms of the former performance metrics.

A. Experimental Setup

In an embodiment, the simulation arena considered having a dimension of 10 m×10 m with a square shaped soft robot of dimension (0.1 m×0.1 m). All the simulations are conducted on a laptop with i7 octa core processor having clock speed of 2.90 GHz and 16 GB RAM. The algorithms are tested in Matlab 2018a with Ubuntu 16.04 operating system, for various 2D, 3D and maze like environments. Experiment is conducted in a 4 m×3 m 1 m arena. Inside the said arena eight obstacles are placed. Amidst obstacles the SFP is tested employing Crazyflie 2.0 quadrotor. The Crazyflie autopilot is a PX4 Autopilot firmware. The motion of the Crazyflie is captured in an OptiTrack-motion capture systems from NaturalPoint, Inc. Simulation and experimental procedures for said setups are provided in the next section.

B. Procedure

This section deals with the simulation and experimental procedures for SEP and reference algorithms both in 2D and 3D. Following nomenclatures are required for both simulation and experiment. Suppose, for $i^{th}$ algorithm $tpr_M^i$, $L_M^i$ and $t_M^i$ refer to mean pre-processing time, mean path length and mean runtime for planning. Also let total mean time is denoted by $T_M^i$, which is the aggregate of $tpr_M^i$ and $t_M^i$. The PI of algorithm is given by equation 3 and equation 4. In equation 3, symbols with M in suffix refers to the corresponding mean. In equation 4, symbols with SD in suffix refers to the corresponding standard deviation. For M and SD computation, all the algorithms are tested multiple times, in each obstacle maps. Here, sixty environments with randomly cluttered obstacles and two mazes are considered. In each run, the run-times are recorded for generating navigable convex free-space creation and the undirected graph formation (for SFP and PRM only). The run-time is the preprocessing time, which is an one time requirement for any obstacle map and is invariant of $q_s$ and $q_g$. The run-time and path length for each planning algorithm is also recorded for each environment. The number of random seeds in Algorithm 1 is empirically selected as 2×number of obstacles. Among the randomly generated seeds, a few seeds are eliminated based on the rule of elimination. Here the rule of elimination is, if more than 3 seeds exist within 0.2 m radius (selected empirically) of a seed (selected empirically), then only one seed is required to survive for avoiding redundancy.

$$PI_M^i = \frac{\max(T_M^i \times L_M^i)}{T_M^i \times L_M^i} \quad (3)$$

$$PI_{SD}^i = \frac{\max(T_{SD}^i \times L_{SD}^i)}{T_{SD}^i \times L_{SD}^i} \quad (4)$$

where i∈[SFP, PRM, RRT, bRRT] stands for algorithm. In case of PRM, number of random samples are fixed as 2×number of obstacles Step size for RRT and bRRT are frizzed at 20 in each run. For empirical validation of random walk based seeding over deterministic seeding one small simulation is conducted in a cluttered environment. To study the success rate of SFP over PRM in a maze, both are tested ten times with different number of seeds and random samples respectively.

The experimental procedure deals with the path offered by the Algorithm 2. The path offered by Algorithm 2 is an optimal sequence of nodes with their coordinates, These node coordinates are employed as the ay pints in the 3D experimental scenario. The current position of the Crazyflie is captured using OptiTrack motion capture system.

C. Result

This section furnishes results based on the setups and procedures mentioned above. It is apparent from FIGS. 6A and 6F, that often the path length offered by the PRM is dominating the same offered by SFR However the overall run-time and PI is always higher in case of SFP, than the mentioned reference algorithms. It is also apparent from FIG. 6C that the PI is increasing in nature with the increase in number of obstacles. FIG. 6D to 6E also indicates that the SFP is much stable, because of the less standard deviation value of run-time and path length for different obstacle maps. A quantitative analysis is depicted in Table I. Referring Table I, for 40 and 50 obstacles, RRT gives a minimum algorithmic performance while for 60 obstacles PRM sets the minimum benchmark. Further, Table 1, depicts that the SFP performs well compared to the mentioned reference algorithms. Table 2 depicts another quantitative analysis of SFP and reference algorithms in a maze (FIG. 7A). It is apparent from Table II, that the SFP outperforms the reference algorithms significantly. Table 2 further depicts that PRM fails to find a path in the maze as shown in FIG. 7A. To validate the performance of PRM empirically, success rate of SFP over PRM is depicted in Table 3. It is apparent from Table 3, that the success rate of SFP is always 100% (because of deterministic seeds) with less number of seeds than random samples employed for PRM.

TABLE 1

| No. of Obstacles | Algorithm | $L_M^i$ | $tpr_i^M$ | $t_M^i$ | $T_M^i$ | $PI_M^i$ |
|---|---|---|---|---|---|---|
| 40 | bRRT | 19.0446 | X | 3.5345 | 3.5345 | 1.799 |
| | RRT | 16.1184 | X | 7.5155 | 7.5155 | 1 |
| | PRM | 15.8018 | 2.9596 | 0.0038 | 2.9634 | 2.59 |
| | SFP | 19.05 | 0.3758 | 0.0139 | 0.3897 | 16.32 |
| 50 | bRRT | 18.145 | X | 3.0014 | 3.0014 | 1.815 |
| | RRT | 18.3523 | X | 5.387 | 5.387 | 1 |
| | PRM | 16.7833 | 2.776 | 0.0055 | 2.7813 | 2.12 |
| | SFP | 13.8593 | 0.1200 | 0.0075 | 0.1275 | 55.95 |
| 60 | bRRT | 17.4102 | X | 2.3836 | 2.3836 | 1.070 |
| | RRT | 16.5127 | X | 1.5808 | 1.5808 | 1.72 |
| | PRM | 16.1382 | 2.7504 | 0.002 | 2.7524 | 1 |
| | SFP | 18.7724 | 0.2480 | 0.0121 | 0.2602 | 58 |

TABLE 2

| Algorithm | $L_M^i$ | $tpr_M^i$ | $t_M^i$ | $T_M^i$ | $PI_M^i$ |
|---|---|---|---|---|---|
| bRRT | 16.01 | X | 101.19 | 101.19 | 1 |
| RRT | 15.86 | X | 53.31 | 53.31 | 1.92 |
| PRM | — | — | — | — | No path found |
| SFP | 12.2 | 0.12685 | 0.001756 | 0.12861 | 1032.1 |

TABLE 3

| PRM | | SFP | | |
|---|---|---|---|---|
| Samples | Success rate (%) | Deterministic seeds | Random seeds (2X No. of obstacles) | Success rate (%) |
| 40 | 0 | 16 | 24 | 100 |
| 50 | 0 | 16 | 24 | 100 |
| 100 | 30 | 16 | 24 | 100 |
| 150 | 90 | 16 | 24 | 100 |
| 200 | 100 | 16 | 24 | 100 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of path planning in a cluttered environment. Here, the path planning is performed based on the random seed generation technique and hyperplane based polytope generation technique. However, the method is suitable for clutter-free environment too.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words “comprising,” “having,” “containing,” and “including,” and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, the method comprising:
  - receiving, by a one or more hardware processors, data pertaining to an environment from an imaging device, wherein the environment comprises a plurality of obstacles;
  - identifying, by the one or more hardware processors, a set of seeds based on the plurality of obstacles by utilizing a random walk based seed generation technique, wherein identifying the set of seeds by utilizing the random walk based seed generation technique comprises steps of:
    - generating a random point inside each obstacle from the plurality of obstacles;
    - performing a random walk by each random point towards a surface of each obstacle;
    - identifying the random point as a seed point when the random point walks outside the obstacle, to obtain a plurality of seed points; and
    - selecting a set of seed points from the plurality of seed points based on an a predefined threshold;
  - constructing, by the one or more hardware processors, a contiguous polytope based on a convex region expanding technique by utilizing the set of seeds;
  - identifying, by the one or more hardware processors, a set of nodes of an undirected graph from the contiguous polytope, wherein the set of nodes are a plurality of polytope points associated with the contiguous polytope; and
  - computing, by the one or more hardware processors, a shortest path in the undirected graph based on a distance between each pair of nodes of the undirected graph.

2. The processor implemented method of claim 1, wherein the method of constructing the contiguous polytope based on the convex region expanding technique by utilizing the set of seeds comprising:
  - constructing a convex region around each seed form the set of seeds to obtain a plurality of convex regions;
  - simultaneously constructing a set of hyperplanes around each convex region from the plurality of convex regions;
  - iteratively expanding, each convex region till the edge of each convex region touches at least one hyperplane associated with rest of the convex regions; and
  - constructing, a contiguous polytope by utilizing the set of hyperplanes corresponding to each convex region, wherein the contiguous polytope comprises a plurality of polytopes corresponding to each set of hyperplanes.

3. The processor implemented method of claim 2, wherein each hyperplane simultaneously adapts to the expanding convex region.

4. The processor implemented method of claim 2, wherein each hyperplane from the set of hyperplanes create a boundary between the plurality of convex regions and the plurality of obstacles.

5. The processor implemented method of claim 1, wherein the plurality of polytope points comprises hyperplane intersection points, an inter polytope intersection point and a center of each polytope.

6. The processor implemented method of claim 1, wherein the environment is at least one of a cluttered environment and a clutter-free environment.

7. A system (100) comprising:
  - a computing device, wherein the computing device comprising:
  - at least one memory storing programmed instructions;
  - one or more hardware processors operatively coupled to the at least one memory, wherein the one or more hardware processors are configured by the programmed instructions to:
    - receive, by the one or more hardware processors , data pertaining to an environment from an imaging device, wherein the environment comprises a plurality of obstacles;
    - identify, by the one or more hardware processors, a set of seeds based on the plurality of obstacles by utilizing a random seed generation technique, wherein identifying the set of seeds by utilizing the random walk based seed generation technique comprises steps of:
      - generating a random point inside each obstacle from the plurality of obstacles;
      - performing a random walk by each random point towards a surface of each obstacle;
      - identifying the random point as a seed point when the random point walks outside the obstacle, to obtain a plurality of seed points; and
      - selecting a set of seed points from the plurality of seed points based on an a predefined threshold;
    - construct, by the one or more hardware processors, a contiguous polytope based on a convex region expanding technique by utilizing the set of seeds;
    - identify, by the one or more hardware processors, a set of nodes of an undirected graph from the contiguous polytope, wherein the set of nodes are a plurality of polytope points associated with the contiguous polytope; and
    - compute, by the one or more hardware processors, a shortest path in the undirected graph based on a distance between each pair of nodes of the undirected graph.

8. The system of claim 7, wherein the path planning unit is configured to construct the contiguous polytope based on the convex region expanding technique by utilizing the set of seeds by:

constructing a convex region around each seed form the set of seeds to obtain a plurality of convex regions;

simultaneously constructing a set of hyperplanes around each convex region from the plurality of convex regions;

iteratively expanding, each convex region till the edge of each convex region touches at least one hyperplane associated with rest of the convex regions; and constructing, a contiguous polytope by utilizing the set of hyperplanes corresponding to each convex region, wherein the contiguous polytope comprises a plurality of polytopes corresponding to each set of hyperplanes.

9. The system of claim 8, wherein each hyperplane simultaneously adapts to the expanding convex region.

10. The system of claim 8, wherein each hyperplane from the set of hyperplanes create a boundary between the plurality of convex regions and the plurality of obstacles.

11. The system of claim 7, wherein the plurality of polytope points comprises hyperplane intersection points, inter polytope intersection point and a center of each polytope.

12. The system of claim 7, wherein the environment is at least one of a cluttered environment and a clutter-free environment.

13. One or more non-transitory machine readable information storage mediums comprising one or more instructions which when executed by one or more hardware processors causes:

receiving, by a one or more hardware processors, data pertaining to an environment from an imaging device, wherein the environment comprises a plurality of obstacles;

identifying, by the one or more hardware processors, a set of seeds based on the plurality of obstacles by utilizing a random walk based seed generation technique, wherein identifying the set of seeds by utilizing the random walk based seed generation technique comprises steps of:

generating a random point inside each obstacle from the plurality of obstacles;

performing a random walk by each random point towards a surface of each obstacle;

identifying the random point as a seed point when the random point walks outside the obstacle, to obtain a plurality of seed points; and selecting a set of seed points from the plurality of seed points based on an a predefined threshold;

constructing, by the one or more hardware processors, a contiguous polytope based on a convex region expanding technique by utilizing the set of seeds;

identifying, by the one or more hardware processors, a set of nodes of an undirected graph from the contiguous polytope, wherein the set of nodes are a plurality of polytope points associated with the contiguous polytope; and computing, by the one or more hardware processors, a shortest path in the undirected graph based on a distance between each pair of nodes of the undirected graph.

* * * * *